United States Patent [19]

Rock

[11] 4,049,546

[45] Sept. 20, 1977

[54] DECOLORIZATION OF EFFLUENTS FROM PULP MILLS

[75] Inventor: Steven L. Rock, Ambler, Pa.

[73] Assignee: Rohm and Haas Company, Philadelphia, Pa.

[21] Appl. No.: 669,563

[22] Filed: Mar. 23, 1976

Related U.S. Application Data

[63] Continuation-in-part of Ser. No. 522,653, Nov. 11, 1974, abandoned.

[51] Int. Cl.² .............................................. B01D 15/06
[52] U.S. Cl. .................................. 210/30 R; 162/30 K; 210/40
[58] Field of Search ......................... 162/16, 29, 30 K; 210/24, 30 R, 32, 37 R, 40; 260/124 R, 124 A, 124 B

[56] References Cited

U.S. PATENT DOCUMENTS

| | | | |
|---|---|---|---|
| 2,675,359 | 4/1954 | Schneider | 260/2.1 E |
| 2,710,254 | 6/1955 | Van Blaricom et al. | 162/16 |
| 3,652,407 | 3/1972 | Paleos | 210/40 |
| 3,663,467 | 5/1972 | Albright | 210/24 |
| 3,990,969 | 11/1976 | Broddevall | 210/32 |

FOREIGN PATENT DOCUMENTS

2,243,141  3/1973  Germany

OTHER PUBLICATIONS

Gustafson et al. "Basicities of Weak Base Ion Exchange Resins," I & EC Fundamentals, vol. 9, No. 2, May 1970, pp. 221 et seq.

*Primary Examiner*—Wilbur L. Bascomb, Jr.
*Assistant Examiner*—Ivars Cintins

[57] ABSTRACT

Pulp mill effluents particularly unbleached streams are decolorized by passing those streams through a mass or bed of macroreticular aliphatic weak anion exchange resin at a pH of 6 – 8.5. Preferred resins are further characterized as possessing a high $pK_a$.

9 Claims, No Drawings

DECOLORIZATION OF EFFLUENTS FROM PULP MILLS

This application is a continuation-in-part of my co-pending U.S. Ser. No. 522,653 filed Nov. 11, 1974, now abandoned.

This invention relates to the decolorization of wood pulp effluents, particularly unbleached kraft wood pulp effluents. More particularly, the invention relates to the decolorization of such effluents by utilizing a macroreticular aliphatic, preferably acrylic, weak anion exchange resin.

Today's pulp industry provides for a process of chemically breaking down wood chips into brown pulp and further washing and processing such pulp to produce light brown unbleached paper. These washing and processing streams result in large quantities of highly colored effluent in which the color bodies are in the form of lignin and lignin by-products. Such lignin products cannot be effectively removed or broken down by biological treatment. They are of concern to the industry since the lignin and lignin by-products when discharged into a receiving water inhibit the penetration of sunlight and consequently the photosynthesis of aquatic biota. It disrupts normal behavior of aquatic life and creates an aesthetically unpleasant environment. Due to such detrimental features government regulations have become more strict to protect the environment from such hazardous streams being discharged into waters serving as municipal or industrial or recreational water sources.

The present invention provides for an effective method of removing at an economic advantage and to a degree not heretofore possible the color bodies from spent pulping liquors or unbleached effluents. By unbleached effluent is meant any pulpmill stream not containing the effluent from an oxidizing step. For example, in bleach pulpmills the pulp is frequently washed prior to the chlorine bleaching step. This wash water despite being present in a bleach pulpmill is an unbleached effluent as defined hereinbefore. Typical unbleached effluents are caustic extraction, washing and screening waters, decker effluent, black liquor spills, dilute spent pulping liquor and unbleached paper machine water. In accordance with the known techniques the separated color bodies are removed from the resin, and ultimately burned in a recovery furnace which produces by-products such as carbon dioxide and $H_2O$. The process may involve filtering the effluent to decrease the suspended solids level and subsequently acidifying the effluent to a pH suitable for ion exchange. The effluent is then passed through a bed of macroreticular acrylic weak base anion exchange resin in the free base form whereby the color bodies are removed by ion exchange and chemisorption. By free base form is meant any resin regenerated with caustic that is not pretreated or activated with an acid wash. Although the resin contains substantial amounts of free base sites, it should be understood that other sites may have been protonated. The resin form is therefore defined as the form of a resin that has not been preactivated with a mineral acid wash. A preferred embodiment would provide for the regeneration of the resin and the chemical elution of the color bodies from the resin by using one of the mill's own caustic process streams known as weak wash or white liquor. Such an embodiment would further provide that the eluate caustic stream with the desorbed color bodies is then returned for normal use in the mill's pulping operation. The color bodies further find their way to the spent pulping liquor called weak black liquor which liquor is subsequently evaporated to increase the solids level and then burned in the mill's caustic recovery furnace to recover the solids that are re-used to make pulping liquor. Alternatively, the eluate caustic stream could be returned directly to the weak black liquor recovery system.

The process of the present invention may provide specific advantages since when the resin is used without pretreatment with mineral acid it avoids precipitation of color bodies in the resin column which frequently may occur if the resin is used in the salt form such as the $HSO_4^-$ form. Additionally it provides for the use of an on-site regenerant such as the mill caustic stream containing $Na_2S$ which, due to the form of the resin, excludes the creation of $H_2S$. In addition to removing lignin and lignin by-products the process of the invention lowers biological oxygen demand (BOD) and chemical oxygen demand (COD) and further removes toxic organic impurities such as natural resin acids and fatty acids.

Prior art processes available to decolorize general pulp mill effluents may be classified into three distinct categories. One process is commonly referred to as the mini-lime process. Another process utilizes alum precipitation and the third is an ion exchange process designed specifically for bleached effluents.

The mini-lime process involves the addition of 1000–2000 ppm of calcium hydroxide to the effluent to form a calcium organic precipitate. This sludge, containing the color bodies, is de-watered and then burned in the mill's lime kiln to recover calcium oxide and to incinerate the color bodies. The alum precipitation process is similar to the mini-lime process in that the alum forms an aluminum organic precipitate which is again de-watered and burned to dispose of the color bodies. Such processes suffer the disadvantage of the requirement of high quantities of expensive chemicals, and additionally are severely hampered by sludge handling problems. The third process available provides for an ion exchange system. This process, described in published Swedish Patent application No. 11726/71, provides for the use of a weak base anion exchange resin in the salt form, preferably $HSO_4^-$. This resin must be regenerated with purchased sulfur ($Na_2S$) free caustic to prevent the creation of toxic hydrogen sulfide. It has been discovered that the use of such a resin in the bisulfate form when applied to unbleached effluents will cause color bodies to precipitate in the resin bed leading to excessive pressure drop across the bed which eventually will severely decrease the possible flow rate.

It has surprisingly been discovered that should the resins be used in the free base form for unbleached effluents the disadvantages of the prior art ion exchange approach disappear.

It should be noted that there is a related fourth prior art process which is also specifically designed for the decolorization of bleached kraft pulp mill effluents, and which is described in U.S. Pat. No. 3,652,407. This process utilizing a polymeric adsorbent possessing no ionic functionality treats highly colored bleached effluents. Due to the nature of these effluents the streams possess a pH of less than 3 and therefore ideally use a non ionic adsorbent. Mills providing for unbleached effluents do not normally have sources of acid at hand and therefore discharge an effluent which is alkaline in nature.

It is therefore an object of the present invention to provide for an effective process for decolorizing unbleached effluents. It is a specific objective of the present invention to provide for a process which obviates the necessity of handling sludge. It is a further specific objective of the present invention to provide for an economical process which utilizes only on-site materials. It is a further objective of the present invention to avoid the creation of excessive quantities of salt cake $Na_2SO_4$. It is a further objective of the present invention to provide for a process which is characterized by relatively low cost operation and low cost installation.

The resins useful in the process of the present invention comprise the macroreticular acrylic weak base ion exchange resins. The resins are further characterized as possessing high $pK_a$. Such resins are derived from suitable monoethylenically unsaturated monomers which monomers include or may be selected from such monomers as methylacrylate, ethyl acrylate, propyl acrylate, isopropyl acrylate, butyl acrylate, tertbutyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethylacrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate, and the corresponding esters of methacrylic acid, ethylene, propylene, isobutylene, diisobutylene, styrene, vinyltoluene, vinyl chloride, vinyl acetate, vinylidene chloride, vinyl acetate, vinylidene chloride and acrylonitrile. Polyethylenically unsaturated monomers which contain only one polymerizable ethylenically unsaturated group, such as isoprene, butadiene, and chloroprene, are also to be regarded as falling within the category of monoethylenically unsaturated monomers.

The above mentioned monomers preferably are copolymerized with comonomers normally referred to as crosslinkers in an amount between 4–50% by weight of monomer or monomer mixture.

Such polyethylenically unsaturated crosslinking monomers may be of the type of polyfunctional methacrylates, for example, ethylene glycol dimethacrylate or trimethylolpropane dimethacrylate. Other crosslinking monomers may include divinylbenzene trivinylbenzene, alkyl divinylbenzene having from 1 to 4 alkyl groups of 1 to 2 carbon atoms substituted in the benzene nucleus, and alkyltrivinylbenzenes having 1 to 3 alkyl groups of 1 to 2 carbon atoms substituted in the benzene nucleus, which are described in U.S. Pat. No. 3,531,463. Besides the homopolymers and copolymers of these polyfunctional monomers, one or more of them may be copolymerized with up to 50% (by weight of the total monomer mixture) of (1) monoethylenically unsaturated monomers, or (2) polyethylenically unsaturated monomers other than the polyfunctional mers just defined or (3) a mixture of (1) and (2).

Examples of the alkyl-substituted di- and trivinyl-benzenes are the various divinyltoluenes, the divinylxylenes, divinylethylbenzene, 1,4-divinyl-2,3,5,6-tetramethylbenzene, 1,3,3-trivinyl-2,4,6-trimethylbenzene, 1,4-divinyl, 2,3,6-triethylbenzene, 1,2,4-trivinyl-3,5-diethylbenzene, 1,3,5-trivinyl-2-methylbenzene.

Examples of other non-ionogenic, polyethylenically unsaturated compounds, which can comprise up to 50 weight percent of the polymer, include:divinylnaphthalenes, diallyl phthalate, ethylene glycol diacrylate, ethylene glycol dimethacrylate, divinysulfone, polyvinyl or polyallyl ethers of glycol, of glycerol, of pentaerythritol, of monothio or dithio-derivatives of glycols, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, trivinylnapthalenes, and polyvinylanthracenes.

As heretofore mentioned, it is preferred to use a suspension polymerization technique. The polymerization is carried out between about 40° C and 120° C, and at atmospheric, subatmospheric or superatmospheric pressure, thereby producing polymer beads or granules. A variety of suspending agents may be used to aid in the suspension of the monomer solvent mixture in an aqueous medium as particles of the desired size. Typical of these materials, a great number of which are known in the art are water soluble polymeric materials such as polyvinyl alcohol, hydroxyethyl cellulose, methyl cellulose, starch and modified starches, hydrolyzed ethylene, maleic anhydride polymers, hydrolyzed styrene-maleic and anhydride copolymers, acrylamide-sodium acrylate copolymers, sodium acrylate copolymers, polyvinyl imidazoline polymers and salts thereof and like.

Other well-known suspending agents are finely divided solids such as magnesium silicate wax and finely divided silicate sold under the name of CAB-O-SIL, finely divided clays and the like. Also sometimes useful are the conventional surface active materials such as octyl phenoxy polyethoxy ethanol, sodium lauryl sulfate, sodium stearate and others. Suitable catalysts, usually in the range of 0.01 to 3% by weight with reference to the weight of the monomer or monomer mixture, may be used to provide free radical initiation in the polymerization reaction. Examples include benzoyl peroxide, lauroyl peroxide, t-butyl hydroperoxide, t-butyl perbenzoate cumene peroxide and azo catalysts such as azo-diisobutyronitrile, or azo-diisobutyramide. Suitable phase-extending or phase-separating solvents include for example, methyl isobutyl carbinol, methyl isobutyl ketone, diisobutyl ketone, N-butyl acetate, xylene, toluene, iso-octane, and chlorobenzene, as well as others known in the art.

The preferred proportion of the polyethylenically unsaturated crosslinking monomer or mixtures of said monomers is from 5–30 and more preferably between 7 and 20 by weight of the total monomer mixture from which the resin is prepared. Suspension polymerization usually produces the resin in the form of granules or beads having an overall bead size in the range of about 0.1 to about 3 millimeters average diameter. The macroreticular resin used in the process of the invention may range from 12–100 mesh (U.S. Standard Screen Series) in particle size. The resin particles preferably range from 20–60 mesh for the balance of adequate decolorization with practical column pressure drops.

Macroreticular resins are characterized by the presence throughout the polymeric matrix of a network of "extra gellular" microchannels or pores. While these microchannels are very small, they are large in comparison with the pores in conventional homogenous crosslinked gels. Macroreticular resins suitable for use in the invention may have specific surface areas of at least 5 sq. meters per gram to 500 sq. meters per gram.

As said herebefore, the resins are further characterized by a high $pK_a$. The $pK_a$ of these resins may range from 5–10, preferably between 6–9.95.

The decolorization process may be carried out in the fixed bed operation or continuously. For example, the resin may be supported in suitable cells or vessels which in most practical operations take the form of a tower or column suitably packed with the resin particles which may be of appropriate size or mesh. The liquid mixture or waste stream influent is passed through the resin mass at a suitable rate such as from top to bottom, or vice versa, so that one of the components is contained on a resin surface. Alternatively, the resin particles may pass in counter-current to the wash water influent. For example, the particles may be continuously fed to the top of a column or tower into the bottom of which the liquid is fed continuously, the particles being removed from the bottom for subsequent treatment to remove or separate the substances sorbed. The process may be operated at flow rates of approximately 4–35 bed volumes per hour and it is an advantage of the process that a range of 15–25 bed volumes/hour is well within the capabilities of the process.

The optical density of the bed influent is measured at an adjusted pH of 7.6 using a spectrophotometer set at 465 $\mu$ and results are expressed in APHA color units (or as ppm on the platinum cobalt scale). It should be noted however that in accordance with the technical bulletin for measuring mill effluents and receiving water colors published by the National Council of Paper Industries for Air and Stream Improvement the samples after pH adjustment are pretreated with 0.8 micron millipore filter to remove noncolor turbidity causing impurities.

The following examples, in which all parts are by weight, serve to further illustrate the process of this invention and the products thereof.

Resin A which has been chosen to illustrate the process of the invention is a macroreticular weak base resin (methyl acrylate) and is available as Amberlite XE-275 from the Rohm and Haas Company. Other macroreticular weak base acrylic resins are commercially available under various commercial designations. Reference is also made to U.S. Pat. No. 2,675,359 which describes acrylic weak base resins.

EXAMPLE I

Decolorization of Unbleached Kraft Pulp Effluent

A sample of unbleached kraft pulp effluent is decolorized by passing it through a fixed bed of resin. The sample is filtered by a sand filter and the pH is adjusted to 8.0 using $H_2SO_4$. The sample is then filtered through a 0.8 $\mu$ millipore filter. The resin bed consists of 20 cm.$^3$ of $-30$, $+40$ mesh Resin A and a 1 cm. diameter, jacketed burette column heated to 60° C. The unbleached effluent is treated at 20 bed volumes/hour. The sample color prior to treatment is 1835 APHA color units (pH 7.6, 465 nm). The color of the treated sample and the cumulative percent decolorization are listed in Table 1.

Table 1

Decolorization of Unbleached Kraft Pulp Effluent with Resin A

| Elapsed Time of Experiment (hr.) | Treated Color (APHA) | Cumulative % Decolorization |
|---|---|---|
| 1 | 134 | 92.7 |
| 2 | 145 | 92.4 |
| 3 | 217 | 91.0 |
| 4 | 196 | 90.6 |

EXAMPLE II

Desorption of Resin

Regeneration of Resin A $-30$, $+40$ mesh) bed is first used in a 1 cm. diameter burette column to treat a simulated unbleached kraft pulp effluent composed of weak black liquor diluted in water to obtain a color of 2471 APHA. The pH is adjusted to 8.0 and the sample is treated at 45° C. at a flow rate of 16 bed volumes/hour. The cumulative percent decolorization at the end of a 3 hr. treatment is 84.8%. The resin bed is then regenerated using simulated weak wash, a paper mill caustic process stream, consisting of 1% NaOH. The resin bed is regenerated at 45° C. at 4 bed volumes/hr. for 1 hour. The spectrophotometer absorbance of each 0.25 bed sample is presented in Table 2.

Table 2

Regeneration of Loaded Resin A Using NaOH

| Bed Volume | Absorbance (465 nm, pH not adjusted to 7.6) | |
|---|---|---|
| 0.25 | 0.109 | |
| 0.5 | 0.171 | |
| 0.75 | 9.3 | (measured as 1:50 dilution) |
| 1.0 | 38.6 | " |
| 1.25 | 60.95 | " |
| 1.5 | 55.9 | " |
| 1.75 | 13.71 | (measured as 1:10 dilution) |
| 2.0 | 2.178 | |
| 2.25 | 0.794 | |
| 2.5 | 0.611 | |
| 2.75 | 0.451 | |
| 3.0 | 0.375 | |
| 3.25 | 0.267 | |
| 3.5 | 0.215 | |
| 3.75 | 0.148 | |
| 4.0 | 0.117 | |

It is observed that the color is chemically eluted with 1% NaOH in a very concentrated form, with the bulk of the color removed with 2 bed volumes.

EXAMPLE III

Comparison of Resins of the Invention with Duolite Resins for Unbleached Kraft Pulp Effluent Decolorization Twenty cm.$^3$ each of Resin A ($-30$, $+40$ mesh) and three Duolite resins, A-4F, A-7, and S-30, are placed in 1 cm. diameter burette columns and treated with 4% NaOH caustic, and then water washed. The $HSO_4^-$ form of the Duolite resins is not used for reasons stated hereinbefore. Each resin is used to decolorize unbleached effluent that is filtered with Supercell and then pH adjusted to 8.0 A flow rate of 20 BV/hour is used at 60° C. with an influent color of 3482 APHA. The decolorization results are listed in Table 3.

Table 3

Decolorization Using Resin A and Comparative Phenolic Resins in the Free Base Form

| Resin | Cumulative % Decolorization | | |
|---|---|---|---|
| | 1st Hour | 2nd Hour | 3rd Hour |
| Resin A | 92.2 | 90.3 | 88.3 |
| Duolite A-4F | 85.0 | 77.4 | 72.3 |
| Duolite A-7 | 61.4 | 50.6 | 44.4 |
| Duolite S-30 | 31.0 | 28.8 | 27.8 |

I claim:

1. Process for removing lignin and lignin by-product color bodies from an unbleached kraft pulp mill stream which comprises passing said stream at a pH of 6–8.5 through a mass or bed of macroreticular aliphatic weak anion exchange resin possessing high $pk_a$ value of between about 5.0 and about 10.0 in the free base form, thereby removing the lignin and lignin by-product color bodies on to the resin.

2. A process as claimed in claim 1 wherein the resin comprises a functionalized methyl acrylate/divinylbenzene copolymer.

3. A process as claimed in claim 1 wherein the resin comprises a functionalized methylacrylate/acrylonitrile copolymer.

4. A process as claimed in claim 1 wherein the resin is characterized as having a $pK_a$ value in the range of from 6–9.5.

5. A process as claimed in claim 1 wherein the resin when exhausted is regenerated by a caustic solution.

6. A process according to claim 1 wherein the aliphatic resin has an acrylic backbone.

7. The process as claimed in claim 1 wherein the weak anion exchange resin is regenerated by contact with a pulp mill process stream containing NaOH.

8. The process as claimed in claim 7 wherein the pulp mill process stream is a caustic process stream containing NaOH and $Na_2S$.

9. The process of claim 7 wherein the pulp mill process stream containing NaOH is further used in paper pulping after being used to regenerate the weak anion exchange resin.

* * * * *